United States Patent
Gela et al.

[11] 3,773,402
[45] Nov. 20, 1973

[54] PANCRATIC LENS

[75] Inventors: Helmut Gela, Sudstadt; Trude Muszumanski, Vienna, both of Austria

[73] Assignees: Karl Vockenhuber; Raimund Hauser, Vienna, Austria

[22] Filed: Sept. 15, 1970

[21] Appl. No.: 72,462

[52] U.S. Cl.................................. 350/184, 350/220
[51] Int. Cl........................ G02b 15/14, G02b 9/34
[58] Field of Search.................... 350/184, 185, 216, 350/220

[56] References Cited
UNITED STATES PATENTS

| 3,350,155 | 10/1967 | Macher............................ 350/184 X |
| 3,512,872 | 5/1970 | Lynch et al...................... 350/184 X |
| 2,778,272 | 1/1957 | Reymond............................ 350/184 |

*Primary Examiner*—Ronald L. Wibert
*Assistant Examiner*—Paul A. Sacher
*Attorney*—Ernest G. Montague

[57] ABSTRACT

The lens comprises a rear lens unit having a fixed focal length and a pancratic lens supplement having a variable magnification factor. The pancratic lens supplement comprises a stationary, positive first lens unit, an axially displaceable, negative second lens unit succeeding the first lens unit, an axially displaceable, positive third lens unit succeeding the second lens unit, and a stationary, negative fourth lens unit succeeding the third lens unit. The second and third lens units are adjustable to a first position, in which the lens has a smallest focal length $f_{Gmin}$, and to a second position in which said lens has a largest focal length $f_{max}$. The third lens unit has in both the first and second positions a magnification factor $\beta_3$ meeting the following conditions:

$$f_{Gmin}/2f_{III} \leq -\beta_{3\,min} \leq f_{Gmin}/f_{III}$$

$$\beta_{3\,max} \approx -1$$

wherein $f_{III}$ is the focal length of the third lens unit. The pancratic lens supplement further comprises means for displacing the second and third lens units to the first and second positions through a first range in accordance with a first function selected to maintain the object focal plane of the lens constant and through a second range in accordance with a second function selected to vary the distance from the object focal plane to the first lens unit.

4 Claims, 10 Drawing Figures

PANCRATIC LENS

This invention relates to a pancratic lens, particularly for photographic purposes, which lens comprises a rear lens unit having a fixed focal length and a lens supplement having a variable magnification factor and comprising a stationary, positive lens unit facing the object, a stationary, negative lens unit facing the rear lens unit, and a negative lens unit and a positive lens unit disposed between said negative and positive stationary lens units.

It is an object of the invention to provide a pancratic lens which enables a formation of a satisfactory image of objects which are disposed within a range between infinity and a few millimeters before the foremost lens element of the lens and without need for auxiliary means such as supplementary lens elements. More particularly, the lens should be capable of forming images to a scale between 1:∞ and 1:−5 so that the lens is suitable for taking photographs substantially in the macro range. Macrophotographs are considered photographs to a scale of 1:−10 to 1:−1.

This object cannot be accomplished with the conventional close-up focusing effected by a displacement of the first lens unit of lenses of the described type because that displacement will not enable photographs of objects closer than about 1 meter.

A lens which is different in type from the one which has been disclosed hereinbefore can be focussed to very close objects by an axial displacement of inner lens units, which are disposed between a first lens unit and a rear lens unit. In this way, image scales in the macro range may be obtained. On the other hand, the ratio of the smallest focal length to the largest one in the known lens is not higher than about 1:4.

In a lens which is of the type described first hereinbefore and which is not so restricted as to its zoom ratio, the object stated above is accomplished in that the magnification factor $\beta_3$ of the displaceable positive third lens unit meets the following conditions when the lens is set to the smallest overall focal length $f_{Gmin}$ and when the lens is set to the largest overall focal length $f_{max}$:

$$f_{Gmin}/2f_{III} \leq -\beta_{3\ min} \leq f_{Gmin}/f_{III}$$

$$\beta_{3\ max} \approx -1$$

wherein $f_{III}$ is the focal length of the third lens unit, and the two displaceable lens units are movable in two portions of their entire range of movement in accordance with two different functions, a displacement in accordance with the first function leaving in known manner the focal plane constant, whereas the displacement in accordance with the second function results also in known manner in an extreme variation of the distance from the object focal plane to the first lens unit.

If L is the distance from the image ($B_1$) formed by the first lens unit to the image ($B_3$) formed by the third lens unit, and $d_8$ is the distance between the second and third lens units, it can be shown that the differential quotient $dL/dd_8$ disappears when the lens is set to the largest focal length $f_{max}$.

This means that in that position the lens is entirely insensitive to a change of the distance between the second and third lens units. When the lens is set to the smallest focal length, an additional displacement of the third lens unit relative to the second lens unit is most effective to change L for a close-up focusing. As a result, the manufacture is not restricted to very small tolerances and the displacement required for a macro setting is so small that a substantial change of the state of correction of the lens is avoided.

It is another object of the invention to develop a more or less afocal pancratic lens supplement having a magnification range of about 1:8 and forming throughout the range of variation an image at a strictly constant position whereas simple optical and mechanical means are employed. Mechanically compensated pancratic systems are known, which involve only a relatively small expenditure of optical means and in which at least one functional group is displaced along the optical axis to produce a zoom effect whereas a second functional group is displaced along the optical axis in response to the movement of the first-mentioned functional group so as to maintain the image in a constant position. This requirement involves a structure which is complicated and expensive. On the other hand, so-called optically compensated pancratic systems have been disclosed. L. Bergstein in his "General Theory of Optically Compensated Pancratic Systems" (Journal of the Optical Society of America, March, 1958) has shown that in a pancratic system of $n$ stationary and displaceable functional groups arranged in alternation, with the displaceable functional groups being rigidly connected, the image is formed $n$ times at the same position during the displacement of the movable functional groups. Whereas this solution involves comparatively simple and inexpensive mechanical means, it requires a large number of functional groups and yet the quality of the image formed by the optically compensated systems, even if they involve a considerable expenditure of optical means, is generally inferior to the quality of the image formed by mechanically compensated systems.

The Austrian Patent Specification No. 244,623 describes a pancratic system which is of a different type and which is a compromise between optically and mechanically compensated systems because its basic structure is similar to a certain extent to the translocators described by Gramatzki ("Probleme der konstruktiven Optik", Berlin, 1957, pp. 116–118, as well as German Patent Specifications 622,046 and 676,946) whereas the image is maintained in a constant position in that the movement of the second displaceable functional group is moved in accordance with a slightly nonlinear function. The systems described by Gramatzki comprise four functional groups. The first of these groups is stationary and positive and is succeeded by a displaceable negative functional group. A positive functional group is moved in accordance with a linear function oppositely to the negative functional group and is succeeded by a negative stationary functional group. The magnification range is insufficient for present-day requirements. In the system disclosed in the German Patent Specification 676,946, the ratio of the largest magnification factor to the smallest one is 4:1. This range of 4:1 has been proved theoretically but can hardly be obtained in practice because the synthesis is based on infinitesimally thin lens elements and these must be replaced by complex functional groups comprising a plurality of lens elements in view of present-day requirements as to aperture and image field. The system according to the invention comprises also four functional groups, namely a positive stationary functional group facing the object, a negative stationary functional group, and a negative and a positive functional groups disposed between said stationary functional groups and adapted to be displaced in mutually opposite directions along the optical axis. The two displaceable lens units make approximately equal contributions to the change of the magnification factor. The latter property is typical of optically compensated pancratic systems.

When the third lens unit is displaced in linear dependence on the position of the second lens unit, the real intermediate image behind the third lens unit is formed twice at the same position during the change of the magnification factor. If the movement of the third lens unit is slightly corrected with the aid of simple mechanical means, the image formed by the substantially optically compensated pancratic system may be maintained strictly in a constant position with simple means throughout the magnification range. The compensating movement depends on the focal length of the third lens unit and may be represented as a second-order function.

It will also be possible, of course, to superimpose the correcting movement on the movement of the second lens unit.

The lens system described by way of example in the Austrian Patent Specification 244,623 has only a magnification range of 1:2 and it is an object of the invention to provide a magnification range of 1 to 8 or more.

This object is accomplished according to the invention in that a. the positive first lens unit consists in a known manner of a negative first lens component and a positive second lens component spaced from the first lens component, the negative lens component having a focal length of about $-420\% f_I$ and the positive lens component having a focal length of about $90\% f_I$, where $f_I$ is the overall focal length of the first lens unit, and the distance $e$ between the associated principal points of the two lens components meets the requirement $$0.7 f_I \geq e \geq 0.35 f_I$$

b. the displaceable negative second lens unit consists of a negative meniscus component, which is convexly curved toward the light-receiving side, and consists of a biconvex lens element and a biconcave lens element cemented to the biconvex lens element, and of a biconvex lens element having almost equal sides, and the refractive power $\phi_{II\,1}$ of the cemented component and the refractive power $\phi_{II\,2}$ of the biconcave lens element meet the following requirement:

$$|0.5\ \phi_{II\,2}| < |\phi_{II\,1}| < |\phi_{II\,2}|$$

c. the positive third lens unit consists of a biconvex lens component and a positive meniscus having approximately the same refractive power, and d. the negative fourth lens unit consists of a single biconcave lens element having a less steeply curved surface which faces the third lens unit.

The invention will now be explained more fully with reference to some embodiments shown by way of example in the drawings, in which.

Figure 1:
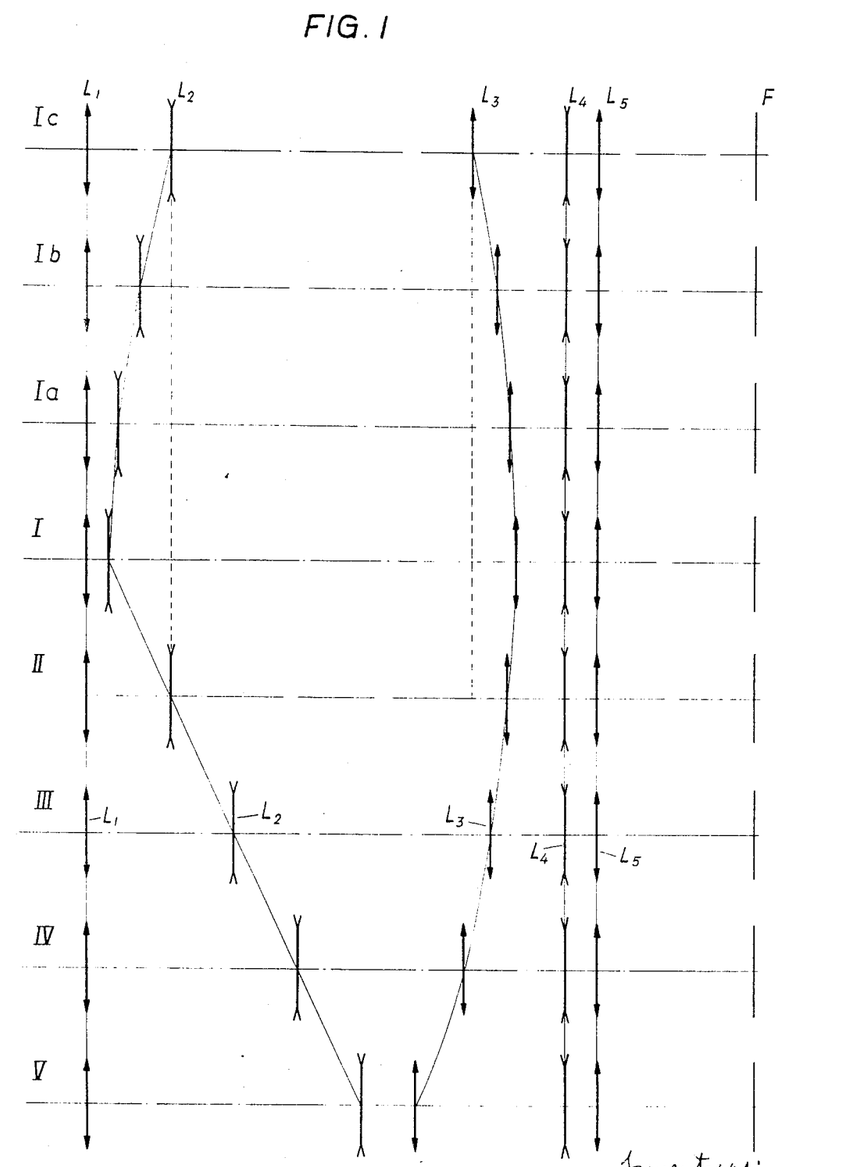
FIG. 1 shows the geometric arrangement of the lens when set to different focal lengths (positions I to V) and in close-up and macro settings (positions I to Ic).

FIG. 1 shows the pancratic system diagrammatically represented by thin lens elements. In positions I to V, an image of an infinite object is formed in the film plane F. Position I corresponds to the smallest focal length $f = 7$ millimeters (wide-angle position) and position V to the largest focal length $f = 56$ millimeters (tele position). The second lens unit $L_2$ has in position I an image scale of 1:−0.347, which increases up to 1:−1 in position V. The third lens unit $L_3$ has a similar function: its image scale ranges from 1:−0.378 in position I to 1:−1 in position V. As a result, an additional displacement of $L_3$ relative to $L_2$ is most effective in positions I and II but this effect decreases as the focal length increases and in position V the system is entirely insensitive to the additional displacement. This is significant for the mechanical adjustment of the entire lens because a small adjustment of the third lens unit $L_3$ will change the wide-angle position and can be controlled to such an extent that it can be matched to the tele position, in which the lens has a very small response. On the other hand, the large response of the lens to a change of the distance between $L_2$ and $L_3$ in positions I and II is essential for a focusing to very small object distances in the two wide-angle positions by a relatively small displacement of $L_3$. If the lens units $L_2$ and $L_3$ were movable to change the image scale from 1:0.6 to 1:−1.6, which change corresponds also to a magnification range of about 1:8, the desired result could not be achieved, as will be explained more fully hereinafter.

The first lens unit $L_1$ produces an intermediate image $B_1$ of an object. Although the first lens unit is positive, the intermediate image may be real or, if the object distance is very small, the intermediate image may be a virtual image. The second lens unit $L_2$ produces at $B_2$ a virtual image of the intermediate image $B_1$ and the third lens unit $L_3$ produces a corresponding real image at $B_3$. L is the distance between $B_1$ and $B_3$. If the object distance and image distance for $L_2$ and $L_3$ are designated $a_2, b_2$ and $a_3, b_3$, respectively, the following conditions will be met:

$$L = d_8 - a_2 + b_3 \tag{1}$$

$$a_3 = b_2 - d_8 \tag{2}$$

$$\beta_3 = b_3/a_3 \tag{3}$$

Several transformations and a differentiation of L for $d_8$ give $$dL/dd_8 = 1 - \beta_3^2 \tag{4}$$

In view of equation 4

$$dL/dd_8 = 0 \quad \text{if} \quad \beta_3 = \pm 1$$

If a pancratic system is designed so that $\beta_3$ equals $-1$ in the position for the largest focal length, that system will be entirely insensitive in the position to a change of the distance between $L_2$ and $L_3$. If $L_2$ and $L_3$ make approximately the same contributions to the change in focal length, the $dL/dd_8$ will reach a maximum in the position for the smallest focal length, in accordance with equation 4. This effect should be utilized for a focusing in the macro range. Favorable conditions for the macro position will be obtained if the following conditions are met at the same time:

$$f_{Gmin}/2f_3 \leq -\beta_{3min} \leq f_{Gmin}/f_3$$

$$\beta_{3max} = -1$$

The results which are due to the basic principle which has been discussed hereinbefore will now be shown with reference to a specific embodiment in which the focal length $f_1$ of the first lens unit $L_1 = 61.174$ mm., the focal length $f_2$ of the second lens unit $L_2 = -15.130$ mm., the focal length $f_3$ of the third lens unit $L_3 = +18.133$ mm., the focal length $f_4$ of the fourth lens unit $L_4 = -19.579$ mm., the focal length $f_5$ of the fifth lens unit $L_5 = +17.769$ mm.

and in which the distance $d_1$ between $L_1$ and $L_2$, the distance $d_2$ between $L_2$ and $L_3$ and the distance $d_3$ between $L_3$ and $L_4$ have in the discrete positions designated I to V in FIG. 1 the following values in millimeters:

|  | I | II | III | IV | V |
|---|---|---|---|---|---|
| $d_4$ | 2.441 | 9.541 | 16.641 | 23.741 | 30.914 |
| $d_8$ | 45.762 | 37.432 | 28.545 | 18.593 | 6.005 |
| $d_{13}$ | 5.402 | 6.632 | 8.419 | 11.271 | 16.686 |
| $f_G$ | 7.276 | 10.253 | 15.544 | 26.415 | 55.520 |
| $dL/dd_8$ | 0.857 | 0.802 | 0.704 | 0.508 | 0 |
| $\beta_3$ | −0.378 | −0.446 | −0.544 | −0.701 | −1.000 |

In the above table, the overall focal lengths $f_G$ of the system in the respective positions are indicated in line 4 and the differential quotients $dL/dd_8$ are indicated in line 5. The image distance $b_5$ between the fifth lens unit $L_5$ and the film plane F is constant and amounts to 17.769 millimeters for an assumed object at a infinite distance.

If the differential quotient is replaced by the difference quotient and $d_8$ is changed by $d_8 = 1$ millimeter, the following near-point distances N will be obtained in the positions corresponding to different focal lengths:

|  | I | II | III | IV | V |
|---|---|---|---|---|---|
| N | 82 | 176 | 462 | 1862 | ∞ |

From the foregoing analysis, the following possibilities for focusing in the macro range are apparent:

a. Only in the position for the smallest focal length: $L_2$ remains in position; $L_3$ is displaced;

b. within a limited zooming range: $L_2$ and $L_3$ are displaced as shown in positions I to Ic in FIG. 1. $L_2$ has the same position in positions Ic and II;

c. $L_2$ and $L_3$ are moved; the movement of $L_2$ controls the change of the image scale in the macro range.

Figure 2:
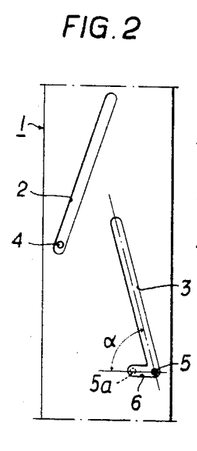
FIGS. 2 to 5 illustrate four embodiments of cam grooves formed in a cylinder which encloses the lens and controlling the displacement of the second and third lens units. These cam grooves are shown in developed views.
Figure 3:
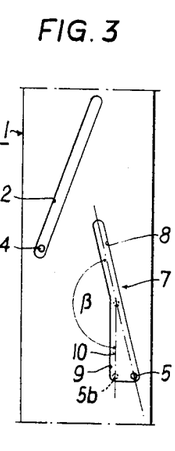
Figures 4, 5:
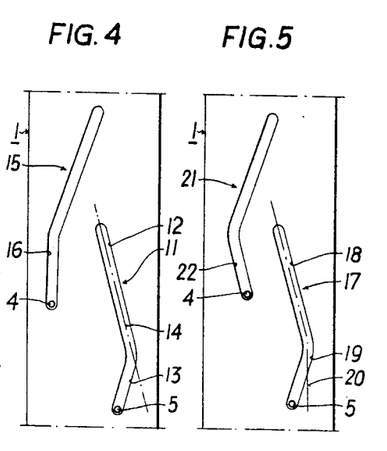
Figure 6:
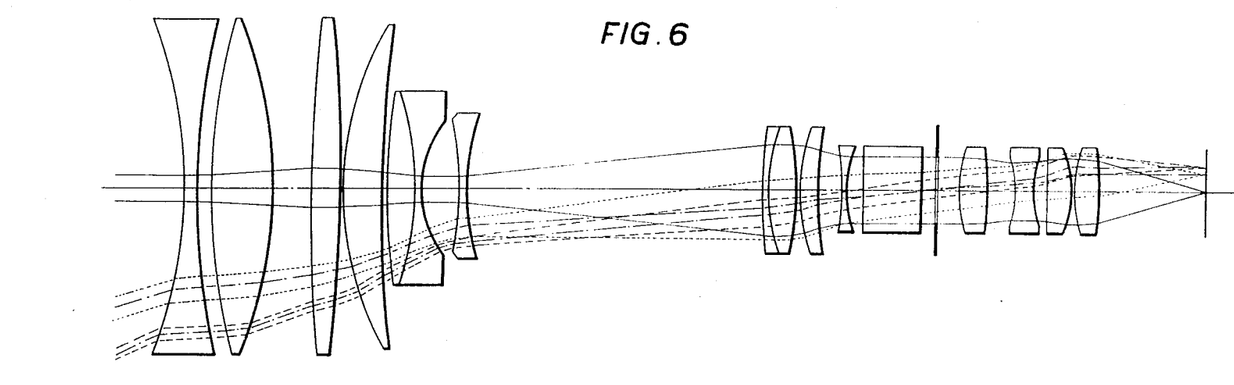
FIGS. 6 to 8 are axial sectional views showing a lens according the invention in a wide-angle position (FIG. 6), tele position (FIG. 7) and macro position (FIG. 8).
Figure 7:
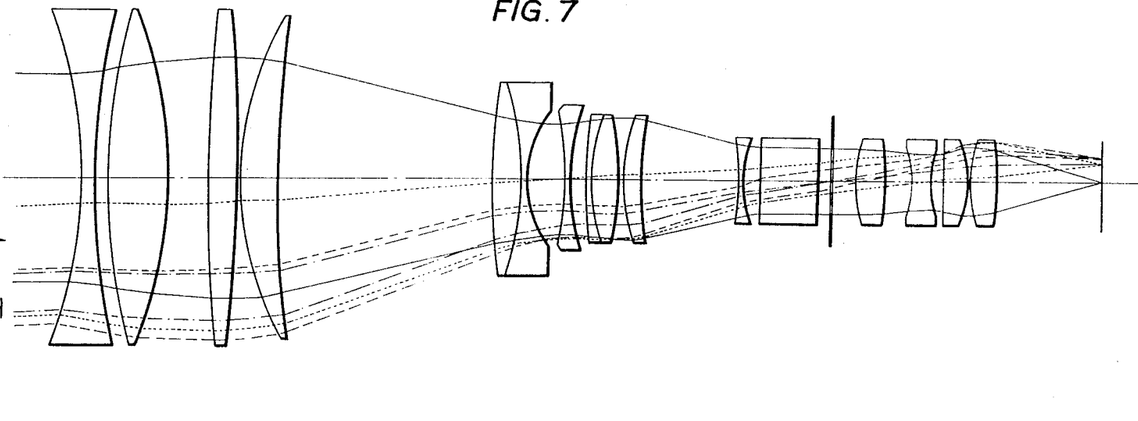
Figure 8:
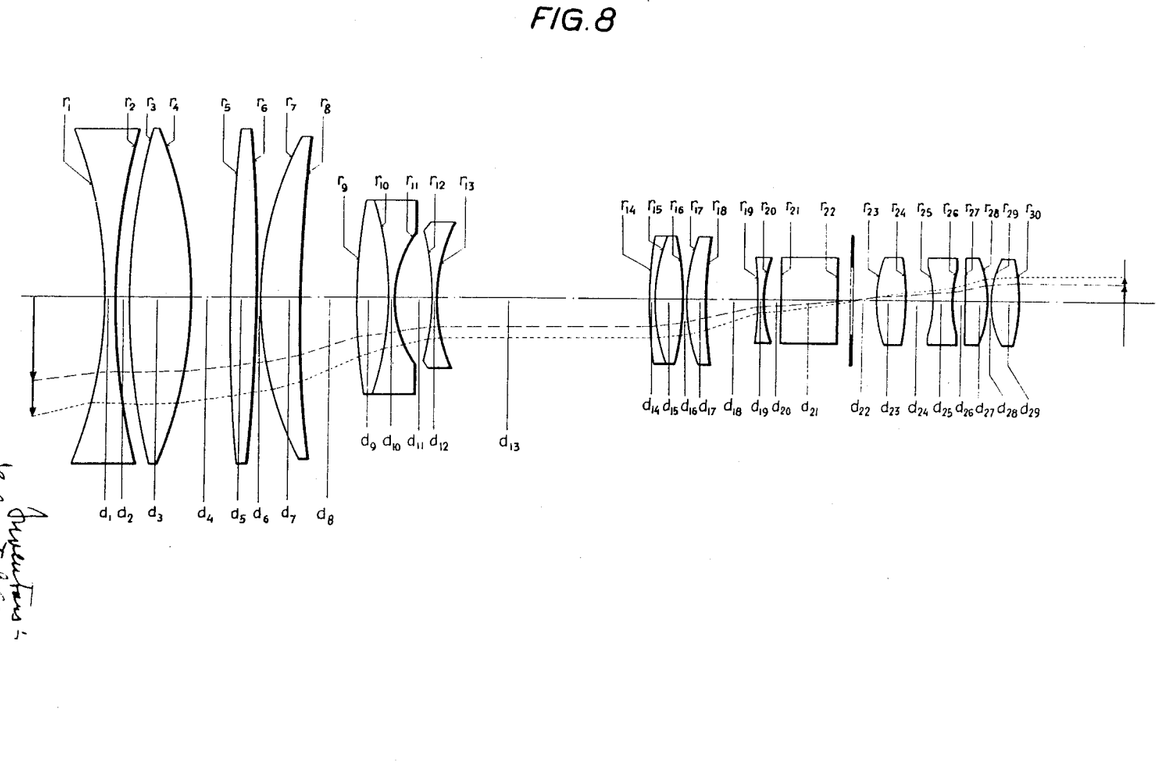

FIGS. 2 to 5 are developed views showing different cam cylinders for lens units 2 and 3. These cylinders are provided on the inside with substantially helical cam grooves, which are engaged by followers. These cam grooves and followers control the movement of the two displaceable lens units. FIG. 2 is a developed view showing a cam cylinder 1 provided with a cam groove 2 for the second lens unit and a cam groove 3 for the third lens unit. A pin 4 is secured to the barrel of the second lens unit and engages the cam groove 3. A pin 5 is secured to the barrel of the third lens unit and guided in the cam groove 3. The pins 4 and 5 are shown in the associated cam grooves in a position corresponding to the wide-angle position of the lens. The cam groove 3 is continued by an axially directed extension groove 6, which includes an angle $\alpha$ with cam groove 3. A spring, not shown, urges the pin 5 against the right-hand side of the cam groove 3. In the wide-angle position of the lens, the third lens unit can be axially displaced against the force of said spring so that the pin 5 can assume the position indicated in dotted lines at 5a and the system is then in a macro position for very near objects. FIG. 4 shows a modification of the cam mechanism just described. A cam groove 15 for the second lens unit is continued by an extension groove 16 having no lead. The cam groove 12 for the third lens unit is continued by an extension groove 13, which includes an obtuse angle with cam groove 12. During an adjustment of that lens barrel beyond the wide-angle range, the second lens unit is held in position whereas the third lens unit is axially displaced toward the second lens unit. FIG. 4 shows the pins 4 and 5 secured to the lens barrels of the second and third lens units, respectively, in the macro position.

The cam mechanisms shown in FIGS. 2 and 4 enable a macro setting in accordance with paragraph (a) above, FIG. 3 shows a cam cylinder for a macro setting in accordance with paragraph (b) above. Just as in FIG. 2, a pin 4 is guided in a cam groove 2 for the second lens unit. The cam groove 7 for the third lens unit is enlarged in the range of wide-angle positions. A spring, not shown, urges the pin 5 against the right-hand side of the cam groove. Different from the embodiment of FIG. 2, the embodiment shown in FIG. 5 enables a macro setting not only in the wide-angle range but also in a medium focal length range. A cam mechanism for adjustment within a macro range according to paragraph (c) above is shown in FIG. 5. Cam grooves 17 and 21 for the third and second lens units, respectively, are extended beyond the wide-angle range by converging portions. The two pins 4 and 5 secured to the barrels of lens units 2 and 3, respectively, are shown in the positions corresponding to the macro position of the system. This embodiment is similar to that of FIG. 4 in that the lens can be set for macrophotographs by a change of the focal length of the lens beyond the wide-angle range.

The present embodiment is designed for Super 8 film and covers a focal length range from 7–56 millimeters and image scales from 1:∞ to 1:−5 so that it is adjustable substantially into the macro range, which is known to include image scales from 1:−10 to up to 1:−1. In the present case, an image of an object having a size of 27×20 millimeters may be formed in the full size of the frame of the Super 8 film.

The design of the lens according to the invention will now be explained more fully.

Lens unit $L_1$ ($r_1$–$r_8$): To ensure that the focal length of lens unit $L_1$ is as short as possible, the lens unit $L_1$ must be designed like a wide-angle lens having a back-focus which is larger than the focal length. This object can be accomplished in known manner in that the positive lens component of lens unit $L_1$ is preceded by a distinctly spaced apart negative lens component. In the present embodiment, the focal length of the positive lens component of lens unit $L_1$ is about 90 percent, the focal length of the negative lens component is about $-420$ percent, and the distance $e$ between the principal points of the two lens components is about 65 percent of the focal length of the entire lens unit $L_1$. The distance $e$ should meet the condition $$0.7 f_I \geq e \geq 0.35 f_I$$

The negative lens component comprises a biconcave lens element and a biconvex lens element, which define between them a negative air meniscus, which is convex toward the light-receiving side and has radii of curvature meeting the condition $$r_3 > r_2 > 0.8\ r_3$$

The positive lens component consists of a biconvex lens element having equal sides and a positive meniscus, whose surfaces are convex toward the light-receiving side, and meets the condition $$\phi_{I_2,1} < \phi_{I_2,2} < 2\phi_{I_2,1}$$

wherein $\phi_{I_2,1}$ and $\phi_{I_2,2}$ are, respectively, the refractive powers of the biconvex lens element and the meniscus.

The biconvex lens element of the negative lens component consists of a glass for which
$n_d > 1.6$
$v_d < 40$
and the two lens elements of the positive lens component consist of glass for which
$n_d > 1.6$
$v_d > 40$.

Lens unit $L_2$ ($r_9$–$r_{13}$) comprises a negative meniscus component, which is concavely curved towards the light-receiving side and consists of a biconvex lens element and a biconcave lens element cemented to the biconvex lens element, and the lens unit $L_2$ further comprises a biconcave lens element having almost equal sides. The following condition is met:

$$|0.5\phi_{II_2}| < |\phi_{II_1}| < |\phi_{II_2}|$$

wherein $\phi_{II_1}$ and $\phi_{II_2}$ are, respectively, the refractive powers of the cemented component and of the biconcave single lens element of lens unit $L_2$. A correction of the spherical aberration and an anasticmatic field flatness are ensured because the following condition is met:

$$|6\phi_{10}| < |\phi_{11}| < |12\phi_{10}|$$

wherein $\phi_{10}$ and $\phi_{11}$ are, respectively, the refractive powers of the tenth and eleventh surfaces.

All three lens elements consist of a glass for which $$n_d \geq 1.62$$

Lens unit $L_3$ ($r_{14}$–$r_{18}$) is subjected to an additional load because it is additionally displaceable for focusing to very near objects (macro position). For this reason, it is desirable to design that lens unit to be substantially stably achromatic so that a correction of chromatic aberration is ensured not only throughout the focal length range but also for all object distances from infinity to a few millimeters before the foremost lens element vertex.

In the present embodiment of the invention, the lens unit $L_3$ consists of a negative meniscus lens element, which is convexly curved toward the light-receiving side, a biconvex lens element, which has substantially equal sides and is cemented to the negative meniscus lens element, and a separate positive meniscus which is concavely curved toward the light-receiving side. The achromatic lens component and the positive meniscus have approximately the same refractive power:

$$\phi_{III_1} \simeq \phi_{III_2}$$

wherein $\phi_{III_1}$ and $\phi_{III_2}$ are, respectively, the refractive powers of the cemented lens component and of the separate meniscus.

Besides $$|3\phi_{III_{1,1}}| > |\phi_{III_{1,2}}| > |2\phi_{III_{1,1}}|$$

wherein $\phi_{III_{1,1}}$ and $\phi_{III_{1,2}}$ are, respectively, the refractive powers of the negative meniscus and of the biconvex lens element cemented thereto.

The design of the positive meniscus is defined by the inequation $|3r_{17}| < |r_{18}| < |5r_{17}|$ All three lens elements of lens unit $L_3$ consist of glass for which $$n_d > 1.65$$

Lens unit $L_4$ ($r_{19}$–$r_{20}$) is a single biconcave lens element and has a less steeply curved surface which faces the above-described lens unit $L_3$ and which is related to the more steeply curved surface in accordance with the condition $$r_{20} < |r_{19}| < 5\ r_{20}$$

The single biconcave lens element $L_4$ consists of a glass for which $$n_d > 1.60$$
$$v_d > 50$$

It is the function of lens unit $L_4$ so to diverge a convergent bundle emerging from lens unit $L_3$ that the bundle emerging from $L_4$ is substantially parallel to the axis.

Lens unit $L_5$ ($r_{23}$–$r_{30}$) is the rear lens unit, which comprises in known manner four single lens elements and meets the condition $$d_{24} > d_{25} > d_{26}$$

where $d_{25}$ is the center thickness of the second lens element, which is biconcave and has equal sides, and $d_{24}$ and $d_{26}$ are respectively, the center distances of said second lens element from the preceding and succeeding positive lens elements.

The radii, distances and glass data of two specific embodiments are compiled in the two following Tables A and B. In these Tables and elsewhere in the specification and claims, $r_1, r_2, \ldots r_{20}$ are in millimeters the radii of curvature of successive boundary surfaces of lens elements, $d_1, d_2, \ldots d_{19}$ are in millimeters the center distances between successive boundary surfaces of lens elements, $n_{d1}, n_{d3}, \ldots n_{d19}$ are the indices of refraction of media having center thicknesses $d_1, d_3, \ldots d_{19}$, respectively, $v_{d1}, v_{d3}, \ldots v_{d19}$ are the Abbe numbers of lens elements having center thicknesses $d_1, d_3, \ldots d_{19}$, $f_I$ is the focal length of the first lens unit, $\phi_{10}$ and $\phi_{11}$ are, respectively, the refractive powers of the boundary surfaces having radii $r_{10}$ and $r_{11}$, $\phi_{I_{2,1}}$ and $\phi_{I_{2,2}}$ are, respectively, the refractive powers of the biconvex lens element and of the meniscus of the positive lens component of the first lens unit, $\phi_{II_1}$ and $\phi_{II_2}$ are, respectively, the refractive powers of the cemented component and of the single biconcave lens element of the second lens unit, $\phi_{III_{1,1}}$ and $\phi_{III_{1,2}}$ are, respectively, the refractive powers of the negative meniscus and of the biconvex lens element cemented to said meniscus in said third lens unit, $\phi_{III_1}$ and $\phi_{III_2}$ are, respectively, the refractive powers of the cemented lens component and of the separate meniscus of said third lens unit, and $\phi_{III}$ is the refractive power of said third lens unit.

Corresponding data for two specific embodiments of the rear lens unit are compiled in the two following tables C and D, in which $r_{23}$, $r_{24}$, ... $r_{30}$ are in millimeters the radii of curvature of successive boundary surfaces of lens elements, $d_{23}$, $d_{25}$, ... $d_{29}$ are in millimeters the center distances between successive boundary surfaces of lens elements, $n_{d23}$, $n_{d25}$, ... $n_{d29}$ are the indices of refraction of media having center thicknesses $d_{23}$, $d_{25}$, ... $d_{29}$, respectively, $v_{d23}$, $v_{d25}$, ... $v_{d29}$ are the Abbé numbers of lens elements having center thicknesses $d_{23}$, $d_{25}$, ... $d_{29}$ and $f_V$ is the focal length of said rear lens unit in millimeters.

TABLE A $r_1$ −67.2    $d_1$=1.9/$n_{d1}$=1.805 $v_{d1}$=25.4
$r_2$ +105    $d_2$=1.9
$r_3$ +116    $d_3$=8.3/$n_{d3}$=1.574 $v_{d3}$=56.4
$r_4$ −60.8   $d_4$=4.9
$r_5$ +187    $d_5$=4.4/$n_{d5}$=1.643 $v_{d5}$=48.0
$r_6$ −187    $d_6$=0.1
$r_7$ +45.4   $d_7$=5.7/$n_{d7}$=1.658 $v_{d7}$=50.9
$r_8$ +166    $d_8$=0.8/$n_{d8}$=−29.3
$r_9$ +93.2   $d_9$=3.8/$n_{d9}$=1.805 $v_{d9}$=25.4
$r_{10}$ −52.2  $d_{10}$=1.0/$n_{d10}$=1.620 $v_{d10}$=60.3
$r_{11}$ +16.6  $d_{11}$=4.9
$r_{12}$ −37.9  $d_{12}$=1.0/$n_{d12}$=1.744 $v_{d12}$=44.8
$r_{13}$ +41.2  $d_{13}$=41.8/$n_{d13}$=−2.0
$r_{14}$ +77.7  $d_{14}$=0.8/$n_{d14}$=1.741 $v_{d14}$=27.6
$r_{15}$ +30.0  $d_{15}$=3.8/$n_{d15}$=1.652 $v_{d15}$=44.9
$r_{16}$ −30.0  $d_{16}$=0.1
$r_{17}$ +19.9  $d_{17}$=2.7/$n_{d17}$=1.720 $v_{d17}$=50.4
$r_{18}$ +78.2  $d_{18}$=2.8/$n_{d18}$=−14.1
$r_{19}$ −41.1  $d_{19}$=0.9/$n_{d19}$=1.620 $v_{d19}$=60.3
$r_{20}$ +17.4

$\phi_{I_{2,1}} = 0.00686$
$\phi_{I_{2,2}} = 0.01074$ $\Big\}$ $f_I = 61.174$ $\phi_{II_1} = -0.02493$
$\phi_{II_2} = -0.03789$ $\Big\}$ $\phi_{III_{1,1}} = -0.01499$
$\phi_{III_{1,2}} = 0.04230$ $\Big\}$ $\phi_{III_1} = 0.02787$ $\phi_{III_2} = 0.02749$ $\Big\}$ $\phi_{III} = 0.05515$ $\phi_{10} = 0.00354$
$\phi_{11} = -0.03746$

TABLE B $r_1$ −67.2    $d_1$=1.9/$n_{d1}$=1.805 $v_{d1}$=25.4
$r_2$ +105    $d_2$=1.9
$r_3$ +116    $d_3$=8.3/$n_{d3}$=1.574 $v_{d3}$=56.4
$r_4$ −60.8   $d_4$=4.9
$r_5$ +187    $d_5$=4.4/$n_{d5}$=1.643 $v_{d5}$=48.0
$r_6$ −187    $d_6$=0.1
$r_7$ +45.4   $d_7$=5.7/$n_{d7}$=1.658 $v_{d7}$=50.9
$r_8$ +166    $d_8$=0.8/$n_{d8}$=−29.3
$r_9$ +93.2   $d_9$=3.8/$n_{d9}$=1.805 $v_{d9}$=25.4
$r_{10}$ −52.2  $d_{10}$=1.0/$n_{d10}$=1.620 $v_{d10}$=60.3
$r_{11}$ +16.6  $d_{11}$=4.9
$r_{12}$ −37.9  $d_{12}$=1.0/$n_{d12}$=1.744 $v_{d12}$=44.8
$r_{13}$ +41.2  $d_{13}$=41.8/$n_{d13}$=−2.0
$r_{14}$ +77.7  $d_{14}$=0.8/$n_{d14}$=1.741 $v_{d14}$=27.6
$r_{15}$ +30.0  $d_{15}$=3.8/$n_{d15}$=1.652 $v_{d15}$=44.9
$r_{16}$ −30.0  $d_{16}$=0.1
$r_{17}$ +19.9  $d_{17}$=2.7/$n_{d17}$=1.717 $v_{d17}$=48.0
$r_{18}$ +78.7  $d_{18}$=2.8/$n_{d18}$=−14.1
$r_{19}$ −40.0  $d_{19}$=0.9/$n_{d19}$=1.620 $v_{d19}$=60.3
$r_{20}$ +17.6

$\phi_{I_{2,1}} = 0.00686$
$\phi_{I_{2,2}} = 0.01074$ $\Big\}$ $f_I = 61.174$ $\phi_{II_1} = -0.02493$
$\phi_{II_2} = -0.03789$ $\Big\}$ $\phi_{III_{1,1}} = -0.01499$
$\phi_{III_{1,2}} = 0.04230$ $\Big\}$ $\phi_{III_1} = 0.02787$ $\phi_{III_2} = 0.02749$ $\Big\}$ $\phi_{III} = 0.05515$ $\phi_{10} = 0.00354$
$\phi_{11} = -0.03746$

TABLE C $r_{23}$ +17.8   $d_{23}$=4.2/$n_{d23}$=1.570 $v_{d23}$=49.5
$r_{24}$ −49.7   $d_{24}$=3.5
$r_{25}$ −16.5   $d_{25}$=2.4/$n_{d25}$=1.847 $v_{d25}$=23.8
$r_{26}$ +16.5   $d_{26}$=1.35
$r_{27}$ −585    $d_{27}$=3.8/$n_{d27}$=1.569 $v_{d27}$=63.1
$r_{28}$ −12.4   $d_{28}$=0.2
$r_{29}$ +18.9   $d_{29}$=3.1/$n_{d29}$=1.620 $v_{d29}$=60.3
$r_{30}$ −23.3

$f_V = 17.769$

TABLE D $r_{23}$ +20.0   $d_{23}$=4.2/$n_{d23}$=1.569 $v_{d23}$=56.1
$r_{24}$ −49.7   $d_{24}$=3.5
$r_{25}$ −19.1   $d_{25}$=2.8/$n_{d25}$=1.847 $v_{d25}$=23.8
$r_{26}$ +19.1   $d_{26}$=1.35
$r_{27}$ −585    $d_{27}$=3.8/$n_{d27}$=1.569 $v_{d27}$=63.1
$r_{28}$ −12.4   $d_{28}$=0.2
$r_{29}$ +16.4   $d_{29}$=3.1/$n_{d29}$=1.641 $v_{d29}$=60.1
$r_{30}$ −45.9

The data compiled in Tables A, B, C, and D are subject to the following tolerances: For the curvature of individual surfaces up to a change of ±10 percent of the refractive power of the respective lens unit, for the thicknesses up to a change of ±10 percent of the focal length of the respective lens unit, for the refractive indices up to ±0.03 and for the Abbé numbers up to ±5.

The pancratic lens supplements defined in Tables A and B may be respectively combined with the rear lens units defined in Tables C and D to provide pancratic lenses.

In each of these pancratic lenses, a plano-parallel glass prism is disposed between the pancratic lens supplement and the rear lens unit and has e.g. a thickness $d_{21} = 8.2$ millimeters, an index of refraction $n_{d21} = 1.569$, an Abbé number $v_{d21} = 56.1$; the distance $d_{20}$ from the prism to the rearmost lens element vertex of the lens supplement is 1.9 millimeters and the distance $d_{22}$ from the prism to the foremost lens element vertex of the rear lens unit is 5.05 millimeters.

The two pancratic lenses defined above by way of example have a smallest focal length $f_{min} = 7$ millimeters and a largest focal length $f_{max} = 56$ millimeters.

The relative aperture is 1:1.8. The shortest distance of an object from the foremost lens element vertex is $$s_1 = 9.48 \text{ millimeters.}$$

Figure 9:
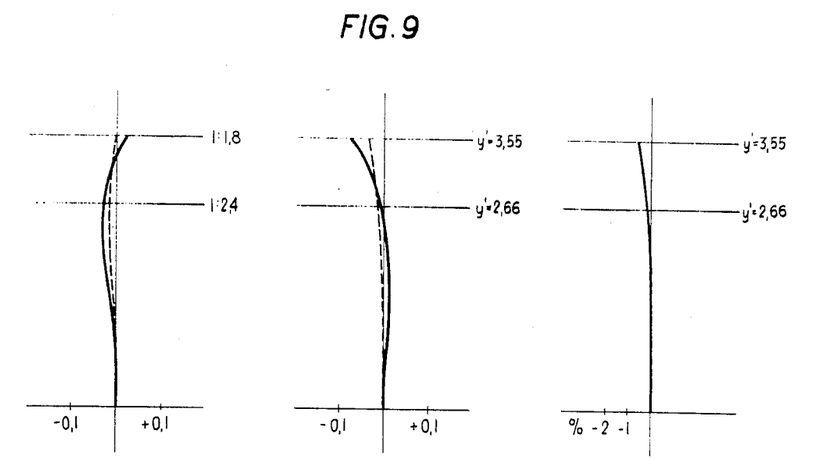
FIGS. 9 and 10 show the state of correction of the lens when set to a given focal length, the lens being shown in FIG. 9 in infinity position and in FIG. 10 in macro position.
Figure 10:
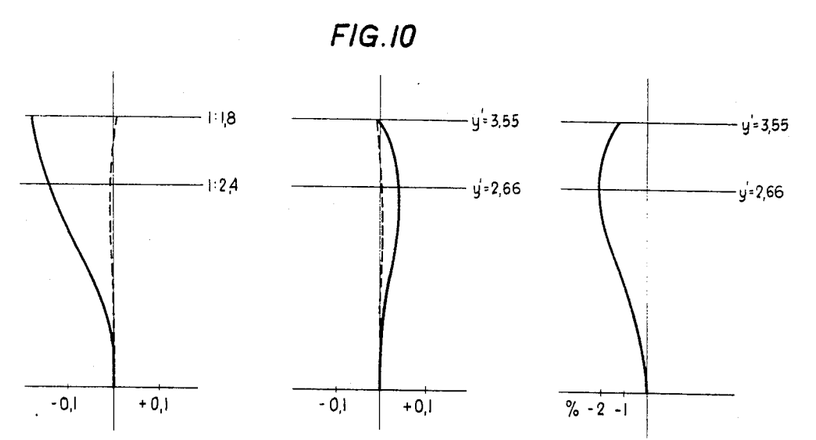

The states of correction for the infinity and macro positions are apparent from FIGS. 9 and 10.

What is claimed is:

1. A pancratic lens supplement having a continuously variable magnification factor and designed like a Galilean telescope, said pancratic lens supplement comprising a stationary, positive first lens unit, an axially displaceable, negative second lens unit succeeding said first lens unit, an axially displaceable, positive third lens unit succeeding said second lens unit, and a stationary, negative fourth lens unit succeeding said third lens unit, said first lens unit consisting of a negative first lens component and a positive second lens component spaced behind said first lens component, said first and second lens components having focal lengths of about $-420\%f_I$ and about $90\%f_I$, respectively, where $f_I$ is the focal length of said first lens unit, said second lens unit consisting of third and fourth lens components, said third lens component consisting of a negative meniscus convexly curved toward the light-receiving side and consisting of a biconvex lens element and a biconcave lens element cemented to said biconvex lens element, said fourth lens component consisting of a biconcave lens element having almost equal sides, said third lens unit consisting of a biconvex lens component and a positive meniscus having about the same refractive power, said fourth lens unit consisting of a single biconcave lens element having a less steeply curved surface facing said third lens unit, said first lens component consists of a biconcave lens element and a biconvex lens element, which define between them a rearwardly concave, negative air meniscus, said second lens component consists of a biconvex lens element having equal sides and a positive meniscus having rearwardly concave surfaces and said biconvex lens component of said third lens unit consists of a negative meniscus which is convexly curved toward said second lens unit and a biconvex lens element having substantially equal sides and which has the following data:

$r_1$—67.2    $d_1=1.9/n_{d1}=1.805$  $v_{d1}=25.4$
$r_2$+105    $d_2=1.9$
$r_3$+116    $d_3=8.3/n_{d3}=1.574$  $v_{d3}=56.4$
$r_4$—60.8   $d_4=4.9$
$r_5$+187    $d_5=4.4/n_{d5}=1.643$  $v_{d5}=48.0$
$r_6$—187    $d_6=0.1$
$r_7$+45.4   $d_7=5.7/n_{d7}=1.658$  $v_{d7}=50.9$
$r_8$+166    $d_8=0.8/n_{d8}=-29.3$
$r_9$+93.2   $d_9=3.8/n_{d9}=1.805$  $v_{d9}=25.4$
$r_{10}$—52.2  $d_{10}=1.0/n_{d10}=1.620$ $v_{d10}=60.3$   $\phi_{10}=0.00354$
$r_{11}$+16.6  $d_{11}=4.9$                                $\phi_{11}=-0.03746$
$r_{12}$—37.9  $d_{12}=1.0/n_{d12}=1.744$ $v_{d12}=44.8$
$r_{13}$+41.2  $d_{13}=41.8/n_{d13}=-2.0$
$r_{14}$+77.7  $d_{14}=0.8/n_{d14}=1.741$ $v_{d14}=27.6$
$r_{15}$+30.0  $d_{15}=3.8/n_{d15}=1.652$ $v_{d15}=44.9$
$r_{16}$—30.0  $d_{16}=0.1$
$r_{17}$+19.9  $d_{17}=2.7/n_{d17}=1.720$ $v_{d17}=50.4$
$r_{18}$+78.2  $d_{18}=2.8/n_{d18}=-14.1$
$r_{19}$—41.1  $d_{19}=0.9/n_{d19}=1.620$ $v_{d19}=60.3$
$r_{20}$+17.4

$\phi_{I_{2,1}} = 0.00686$
$\phi_{I_{2,2}} = 0.01074$ $\Big\}$ $f_I=61.174$ $\phi_{II_1} = -0.02493$
$\phi_{II_2} = -0.03789$ $\phi_{III_{1,1}} = -0.01499$
$\phi_{III_{1,2}} = 0.04230$ $\Big\}$ $\phi_{III_1} = 0.02787$ $\phi_{III_2} = 0.02749$ $\Big\}$ $\phi_{III}=0.05515$ wherein $r_1, r_2, \ldots r_{20}$ are in millimeters the radii of curvature of successive boundary surfaces of lens elements, $d_1, d_2, \ldots d_{19}$ are in millimeters the center distances between successive boundary surfaces of lens elements, $n_{d1}, n_{d3}, \ldots n_{d19}$ are the indices of refraction of media having center thicknesses $d_1, d_3, \ldots d_{19}$, respectively, $v_{d1}, v_{d3}, \ldots v_{d19}$ are the Abbé numbers of lens elements having center thicknesses $d_1, d_3, \ldots d_{19}$, $f_I$ is the focal length of the first lens unit, $\phi_{10}$ and $\phi_{11}$ are, respectively, the refractive powers of the forward and rear surfaces of said biconvex lens element of said third lens component, $\phi_{I_{2,1}}$ and $\phi_{I_{2,2}}$ are, respectively, the refractive powers of the biconvex lens element and of the meniscus of said second lens component, $\phi_{II_1}$ and $\phi_{II_2}$ are, respectively, the refractive powers of said third and fourth lens components, wherein $\phi_{III_{1,1}}$ and $\phi_{III_{1,2}}$ are, respectively, the refractive powers of said meniscus and said biconvex lens element of said biconvex lens component, $\phi_{III_1}$ and $\phi_{III_2}$ are, respectively, the refractive powers of said biconvex lens component and said positive meniscus of said third lens unit, and $\phi_{III}$ is the refractive power of said third lens unit.

2. A pancratic lens supplement having a continuously variable magnification factor and designed like a Galilean telescope, said pancratic lens supplement comprising a stationary, positive first lens unit, an axially displaceable, negative second lens unit succeeding said first lens unit, an axially displaceable, positive third lens unit succeeding said second lens unit, and a stationary, negative fourth lens unit succeeding said third lens unit, said first lens unit consisting of a negative first lens component and a positive second lens component spaced behind said first lens component, said first and second lens components having focal lengths of about $-420\%f_I$ and about $90\%f_I$, respectively, where $f_I$ is the focal length of said first lens unit, said second lens unit consisting of third and fourth lens components, said third lens component consisting of a negative meniscus convexly curved toward the light-receiving side and consisting of a biconvex lens element and a biconcave lens element cemented to said biconvex lens element, said fourth lens component consisting of a biconcave lens element having almost equal sides, said third lens unit consisting of a biconvex lens component and a positive meniscus having about the same refractive power, said fourth lens unit consisting of a single biconcave lens element having a less steeply curved surface facing said third lens unit, said first lens component consists of a biconcave lens element and a biconvex lens element, which define between them a rearwardly concave, negative air meniscus, said second lens component consists of a biconvex lens element having equal sides and a positive meniscus having rearwardly concave surfaces and said biconvex lens component of said third lens unit consists of a negative meniscus which is convexly curved toward said second lens unit and a biconvex lens element having substantially equal sides and which has the following data:

$r_1$—67.2    $d_1=1.9/n_{d1}=1.805$  $v_{d1}=25.4$
$r_2$+105    $d_2=1.9$
$r_3$+116    $d_3=8.3/n_{d3}=1.574$  $v_{d3}=56.4$
$r_4$—60.8   $d_4=4.9$
$r_5$+187    $d_5=4.4/n_{d5}=1.643$  $v_{d5}=48.0$
$r_6$—187    $d_6=0.1$
$r_7$+45.4   $d_7=5.7/n_{d7}=1.658$  $v_{d7}=50.9$
$r_8$+166    $d_8=0.8/n_{d8}=-29.3$
$r_9$+93.2   $d_9=3.8/n_{d9}=1.805$  $v_{d9}=25.4$
$r_{10}$—52.2  $d_{10}=1.0/n_{d10}=1.620$ $v_{d10}=60.3$  $\phi_{10}=0.00354$
$r_{11}$+16.6  $d_{11}=4.9$                              $\phi_{11}=-0.03746$
$r_{12}$—37.9  $d_{12}=1.0/n_{d12}=1.744$ $v_{d12}=44.8$
$r_{13}$+41.2  $d_{13}=41.8/n_{d13}=-2.0$ $r_{14}$ +77.7    $d_{14}$=0.8/$n_{d14}$=1.741 $v_{d14}$=27.6
$r_{15}$ +30.0    $d_{15}$=3.8/$n_{d15}$=1.652 $v_{d15}$=44.9
$r_{16}$ −30.0    $d_{16}$=0.1
$r_{17}$ +19.9    $d_{17}$=2.7/$n_{d17}$=1.717 $v_{d17}$=48.0
$r_{18}$ +78.7    $d_{18}$=2.8/$n_{d18}$=−14.1
$r_{19}$ −40.0    $d_{19}$=0.9/$n_{d19}$=1.620 $v_{d19}$=60.3
$r_{20}$ +17.6

$\phi_{I_{2,1}}$ =0.00686
$\phi_{I_{2,2}}$ =0.01074        $f_I$=61.174
                 $\phi_{II_1}$=−0.02493
                 $\phi_{II_2}$=−0.03789
$\phi_{III_{1,1}}$ =−0.01499
$\phi_{III_{1,2}}$ =0.04230      $\phi_{III_1}$=0.02787
                 $\phi_{III_2}$=0.02749       $\phi_{III}$=0.05515 wherein $r_1$, $r_2$, ... $r_{20}$ are in millimeters the radii of curvature of successive boundary surfaces of lens elements, $d_1$, $d_2$, ... $d_{19}$ are in millimeters the center distances between successive boundary surfaces of lens elements, $n_{d1}$, $n_{d3}$, ... $n_{d19}$ are the indices of refraction of media having center thicknesses $d_1$, $d_3$, ... $d_{19}$, respectively, $v_{d1}$, $v_{d3}$, ... $v_{d19}$ are the Abbé numbers of lens elements having center thicknesses $d_1$, $d_3$, ... $d_{19}$, $f_I$ is the focal length of the first lens unit, $\phi_{10}$ and $\phi_{11}$ are, respectively, the refractive powers of the forward and rear surfaces of said biconvex lens element of said third lens component, $\phi_{I_{2,1}}$ and $\phi_{I_{2,2}}$ are, respectively, the refractive powers of said second lens component, $\phi_{II_1}$ and $\phi_{II_2}$ are, respectively, the refractive powers of said third and fourth lens components, wherein $\phi_{III_{1,1}}$ and $\phi_{III_{1,2}}$ are, respectively, the refractive powers of said meniscus and said biconvex lens element of said biconvex lens component, $\phi_{III_1}$ and $\phi_{III_2}$ are, respectively, the refractive powers of said biconvex lens component and said positive meniscus of said third lens unit, and $\phi_{III}$ is the refractive power of said third lens unit.

3. A pancratic lens, which comprises
a rear lens unit having a fixed focal length and
a pancratic lens supplement having a continuously variable magnification factor and designed like a Galilean telescope,
said pancratic lens supplement comprising a stationary, positive first lens unit, an axially displaceable, negative second lens unit succeeding said first lens unit, an axially displaceable, positive third lens unit succeeding said second lens unit and a stationary, negative fourth lens unit succeeding said third lens unit,
said first lens unit consisting of a negative first lens component and a positive second lens component spaced behind said first lens component,
said first and second lens components having focal lengths of about −420%$f_I$ and about 90%$f_I$, respectively, where $f_I$ is the focal length of said first lens unit,
said second lens unit consisting of third and fourth lens components,
said third lens component consisting of a negative meniscus convexly curved toward the light-receiving side and consisting of a biconvex lens element and a biconcave lens element cemented to said biconvex lens element,
said fourth lens component consisting of a biconcave lens element having almost equal sides,
said third lens unit consisting of a biconvex lens component and a positive meniscus having about the same refractive power,
said fourth lens unit consisting of a single biconcave lens element having a less steeply curved surface facing said third lens unit,
said second and third lens units being adjustable to a first position in which said lens has a smallest focal length $f_{min}$, and to a second position in which said lens has a largest focal length $f_{max}$,
said pancratic lens supplement further comprising means for displacing said second and third lens units to said first and second positions through a first range in accordance with a first function selected to maintain the object focal plane of the lens constant and through a second range in accordance with a second function selected to vary the distance from the object focal plane to said first lens unit,
said rear lens unit constitutes an extended triplet consisting of a biconvex lens element, a biconcave lens element and two positive single lens elements,
said biconcave lens element of said rear lens unit has equal sides and meets the condition:

$d_{24} > d_{25} > d_{26}$ wherein $d_{25}$ is the center thickness of said biconcave lens element and $d_{24}$ and $d_{26}$ are the vertex distances from said biconcave lens element to adjacent lens elements,
said rear lens unit has the following data:

$r_{23}$ +17.8    $d_{23}$=4.2/$n_{d23}$=1.570 $v_{d23}$=49.5
$r_{24}$ −49.7    $d_{24}$=3.5
$r_{25}$ −16.5    $d_{25}$=2.4/$n_{d25}$=1.847 $v_{d25}$=23.8    $f_V$=17.769
$r_{26}$ +16.5    $d_{26}$=1.35
$r_{27}$ −585     $d_{27}$=3.8/$n_{d27}$=1.569 $v_{d27}$=63.1
$r_{28}$ −12.4    $d_{28}$=0.2
$r_{29}$ +18.9    $d_{29}$=3.1/$n_{d29}$=1.620 $v_{d29}$=60.3
$r_{30}$ −23.3 in which $r_{23}$, $r_{24}$, ... $r_{30}$ are in millimeters the radii of curvature of successive boundary surfaces of lens elements, $d_{23}$, $d_{25}$, ... $d_{29}$ are in millimeters the center distances between successive boundary surfaces of lens elements, $n_{d23}$, $n_{d25}$, ... $n_{d29}$ are the indices of refraction of media having center thicknesses $d_{23}$, $d_{25}$, ... $d_{29}$, respectively, $v_{d23}$, $v_{d25}$, ... $v_{d29}$ are the Abbé numbers of lens elements having center thicknesses $d_{23}$, $d_{25}$, ... $d_{29}$ and $f_V$ is the focal length of said rear lens unit in millimeters.

4. A pancratic lens, which comprises
a rear lens unit having a fixed focal length and
a pancratic lens supplement having a continuously variable magnification factor and designed like a Galilean telescope,
said pancratic lens supplement comprising a stationary, positive first lens unit, an axially displaceable, negative second lens unit succeeding said first lens unit, an axially displaceable, positive third lens unit succeeding said second lens unit, and a stationary, negative fourth lens unit succeeding said third lens unit,
said first lens unit consisting of a negative first lens component and a positive second lens component spaced behind said first lens component,
said first and second lens components having focal lengths of about −420%$f_I$ and about 90%$f_I$, respectively, where $f_I$ is the focal length of said first lens unit, said second lens unit consisting of third and fourth lens components, said third lens component consisting of a negative meniscus convexly curved toward the light-receiving side and consisting of a biconvex lens element and a biconcave lens element cemented to said biconvex lens element, said fourth lens component consisting of a biconcave lens element having almost equal sides, said third lens unit consisting of a biconvex lens component and a positive meniscus having about the same refractive power, said fourth lens unit consisting of a single biconcave lens element having a less steeply curved surface facing said third lens unit, said second and third lens units being adjustable to a first position in which said lens has a smallest focal length $f_{min}$, and to a second position in which said lens has a largest focal length $f_{max}$, said pancratic lens supplement further comprising means for displacing said second and third lens units to said first and second positions through a first range in accordance with a first function selected to maintain the object focal plane of the lens constant and through a second range in accordance with a second function selected to vary the distance from the object focal plane to said first lens unit, said rear lens unit constitutes an extended triplet consisting of a biconvex lens element, a biconcave lens element and two positive single lens elements, said biconcave lens element of said rear lens unit has equal sides and meets the condition:

$$d_{24} > d_{25} > d_{26}$$

wherein $d_{25}$ is the center thickness of said biconcave lens element and $d_{24}$ and $d_{26}$ are the vertex distances from said biconcave lens element to adjacent lens elements, $r_{23}$ +20.0  $d_{23}$=4.2/$n_{d23}$=1.569 $v_{d23}$=56.1
$r_{24}$ −49.7  $d_{24}$=3.5
$r_{25}$ −19.1  $d_{25}$=2.8/$n_{d25}$=1.847 $v_{d25}$=23.8
$r_{26}$ +19.1  $d_{26}$=1.35
$r_{27}$ −585   $d_{27}$=3.8/$n_{d27}$=1.569 $v_{d27}$=63.1
$r_{28}$ −12.4  $d_{28}$=0.2
$r_{29}$ +16.4  $d_{29}$=3.1/$n_{d29}$=1.641 $v_{d29}$=60.1
$r_{30}$ −45.9 in which $r_{23}$, $r_{24}$, ... $r_{30}$ are in millimeters the radii of curvature of successive boundary surfaces of lens elements, $d_{23}$, $d_{25}$, ... $d_{29}$ are in millimeters the center distances between successive boundary surfaces of lens elements, $n_{d23}$, $n_{d25}$, ... $n_{d29}$ are the indices of refraction of media having center thicknesses $d_{23}$, $d_{25}$, ... $d_{29}$, respectively, $v_{d23}$, $v_{d25}$, ... $v_{d29}$ are the Abbé numbers of lens elements having center thicknesses $d_{23}$, $d_{25}$, ... $d_{29}$ and $f_V$ is the focal length of said rear lens unit in millimeters.

* * * * *